(12) United States Patent
Hara et al.

(10) Patent No.: US 6,885,360 B2
(45) Date of Patent: Apr. 26, 2005

(54) LIQUID CRYSTAL DISPLAY DEVICE FOR USE IN ELECTRONIC APPARATUS

(75) Inventors: Yasushi Hara, Kawasaki (JP); Keiichi Murakami, Kawasaki (JP); Hiroshi Yamada, Kawasaki (JP); Hideyuki Motoyama, Kawasaki (JP); Hirokazu Aritake, Kawasaki (JP); Toshiaki Yoshihara, Kawasaki (JP); Shinji Tadaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 10/092,309

(22) Filed: Mar. 7, 2002

(65) Prior Publication Data

US 2003/0067436 A1 Apr. 10, 2003

(30) Foreign Application Priority Data

Oct. 5, 2001 (JP) ........................................ 2001-310092

(51) Int. Cl.⁷ ................................................ G09G 3/36
(52) U.S. Cl. ............................. 345/102; 349/65; 349/68
(58) Field of Search ........................ 345/102, 87, 207, 345/211; 349/61–70; 362/29, 26

(56) References Cited

U.S. PATENT DOCUMENTS

| | | | |
|---|---|---|---|
| 5,143,433 A | | 9/1992 | Farrell |
| 5,477,239 A | * | 12/1995 | Busch et al. ................. 345/102 |
| 6,447,132 B1 | * | 9/2002 | Harter, Jr. .................... 362/29 |
| 6,496,236 B1 | * | 12/2002 | Cole et al. .................... 349/61 |

FOREIGN PATENT DOCUMENTS

| | | |
|---|---|---|
| JP | 4-323630 | 11/1992 |
| JP | 4-336525 | 11/1992 |
| JP | 5-224200 | 9/1993 |
| JP | 5-289076 | 11/1993 |
| JP | 6-124152 | 5/1994 |
| JP | 7-095157 | 4/1995 |
| JP | 7-26828 | 5/1995 |
| JP | 7-209006 | 8/1995 |
| JP | 8-036180 | 2/1996 |
| JP | 8-101387 | 4/1996 |
| JP | 9-043603 | 2/1997 |
| JP | 11-038410 | 2/1999 |
| JP | 11-101980 | 4/1999 |
| JP | 2001-135118 | 5/2001 |
| JP | 2001-167622 | 6/2001 |

* cited by examiner

*Primary Examiner*—Dennis-Doon Chow
(74) *Attorney, Agent, or Firm*—Westerman, Hattori, Daniels & Adrian, LLP

(57) ABSTRACT

A backlight device for a transmissive liquid crystal display device includes a plurality of light sources, including a cold cathode fluorescent lamp and an LED, a liquid crystal panel, and a light guide plate. The light guide plate causes light entering into it through one surface thereof to emerge out of another surface thereof toward the liquid crystal panel. A controller for the backlight device selects at least one of the cold cathode fluorescent lamp and LED, depending on brightness required for the liquid crystal display device and determines, in accordance with the required brightness, the brightness of the selected light source to operate the light source accordingly.

17 Claims, 9 Drawing Sheets

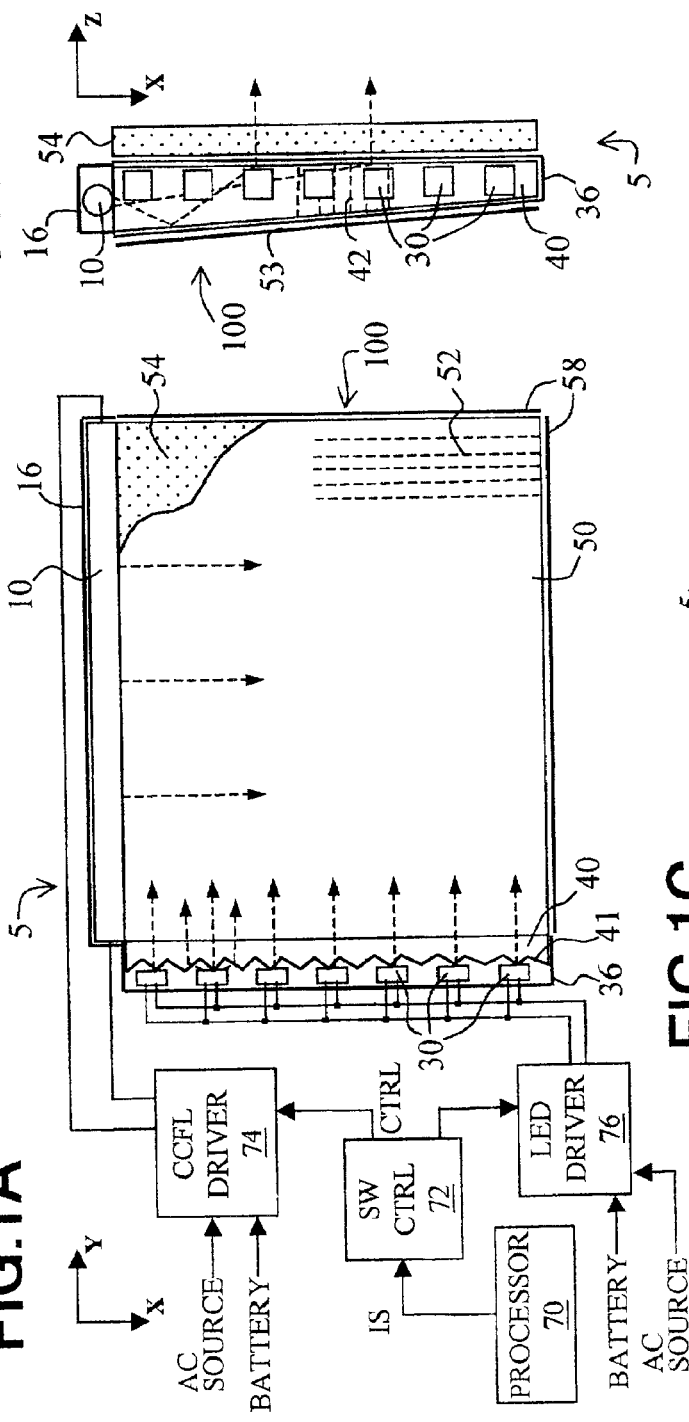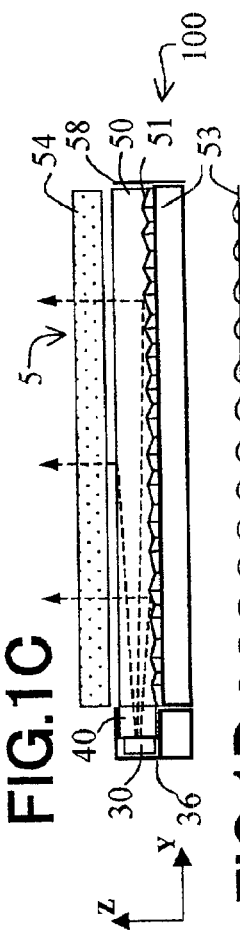

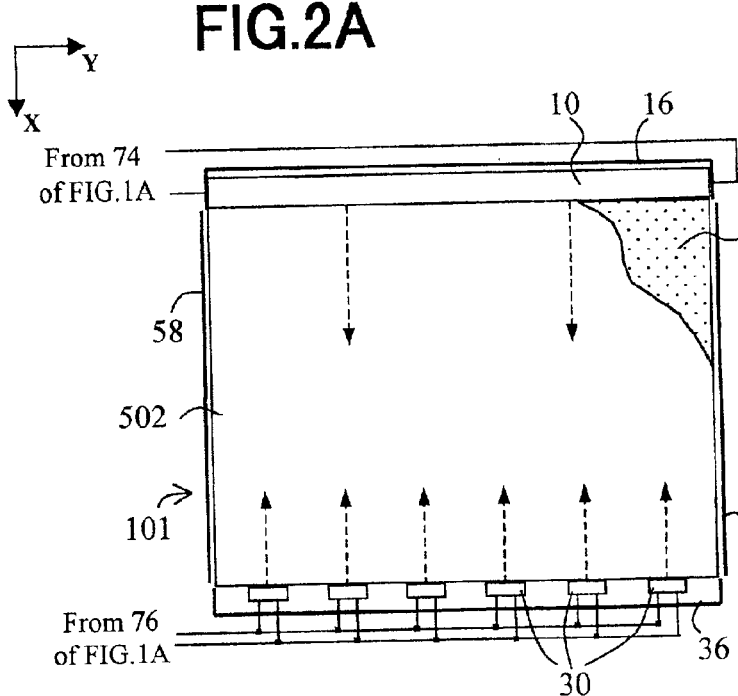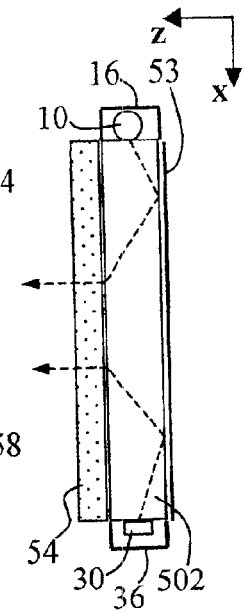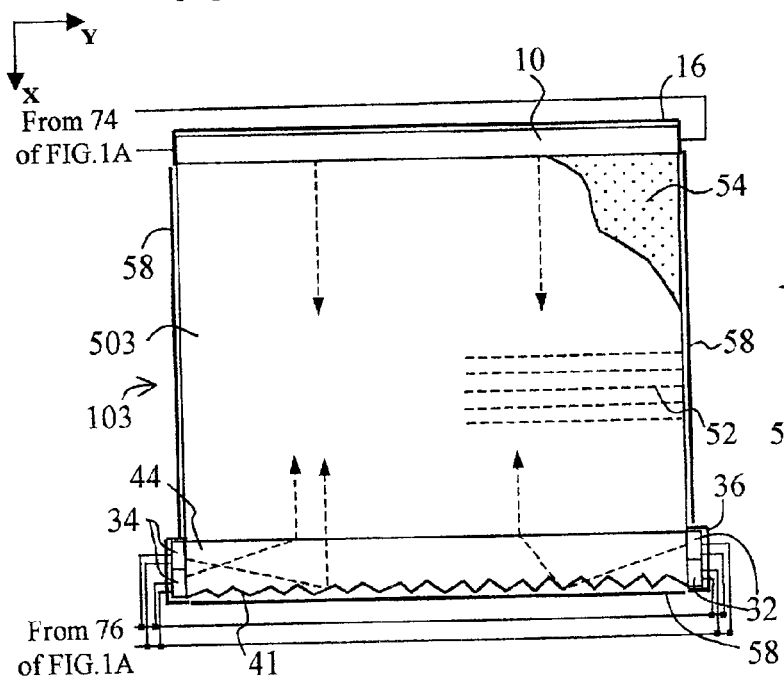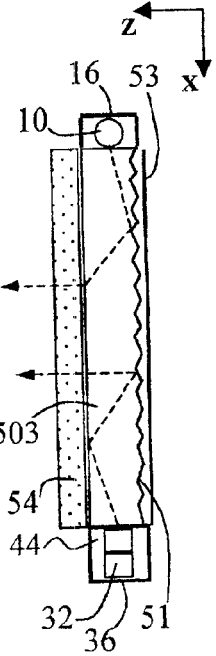

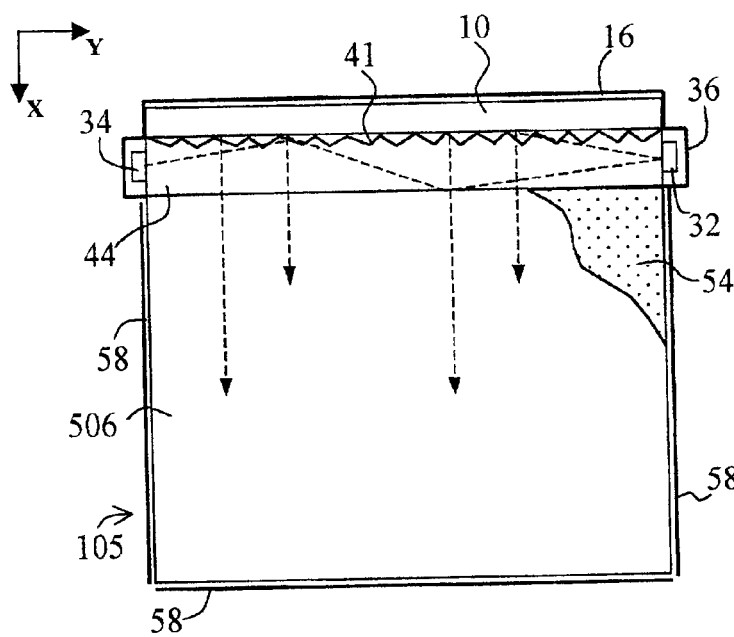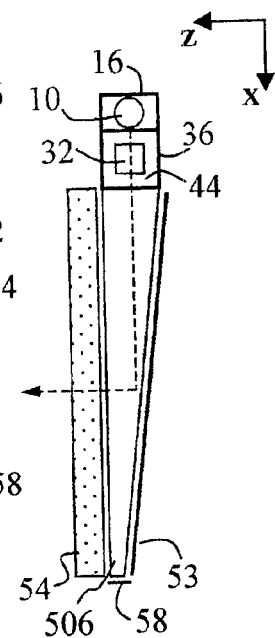
FIG.4A FIG.4B
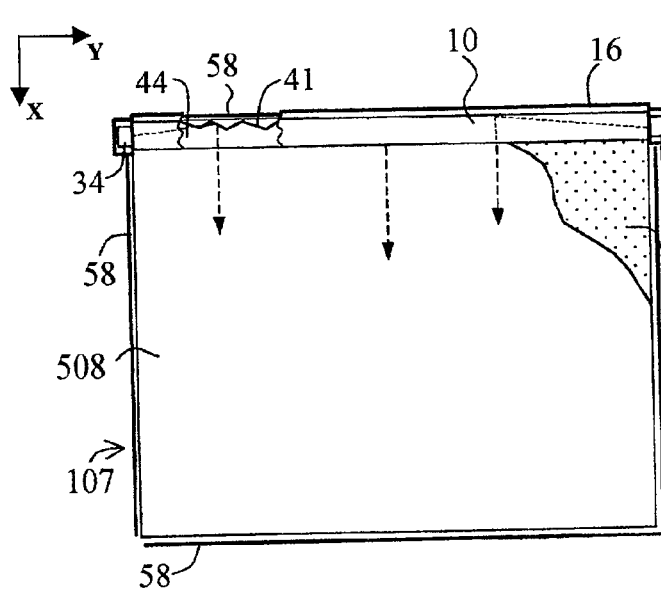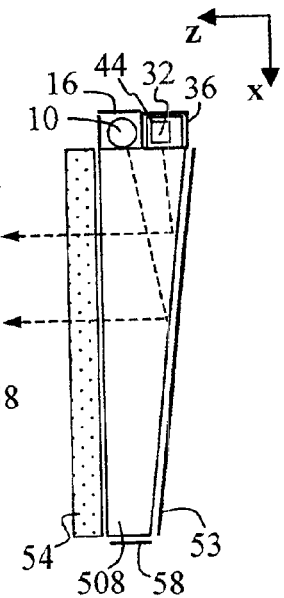
FIG.5A FIG.5B

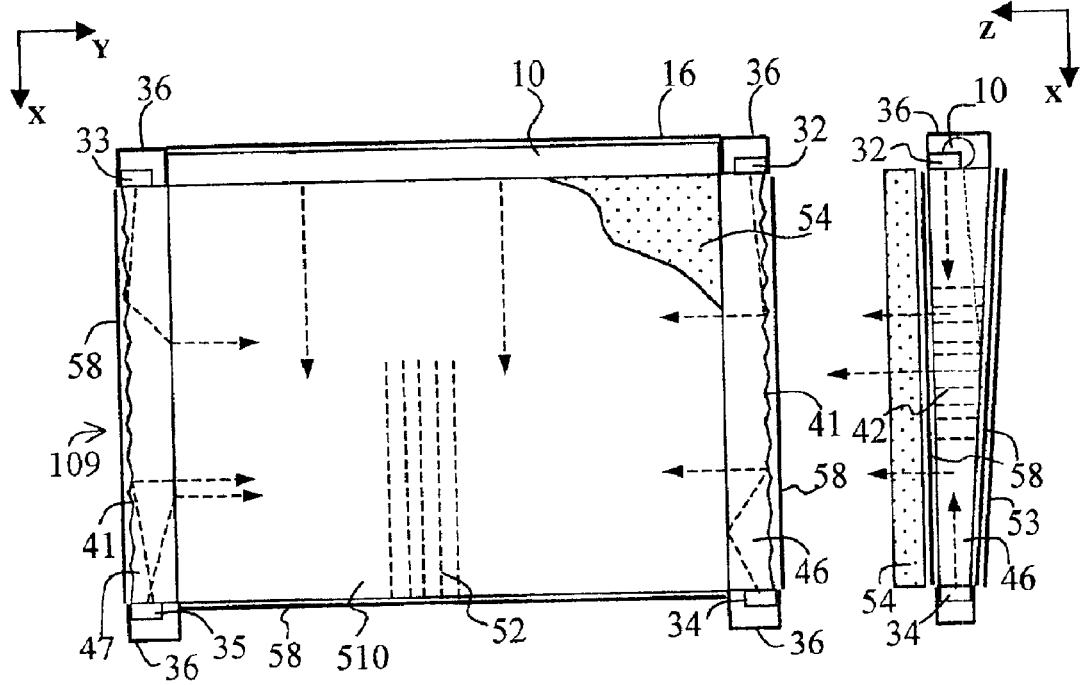
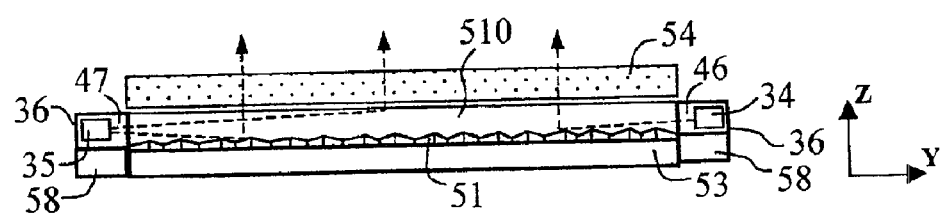

FIG.7A
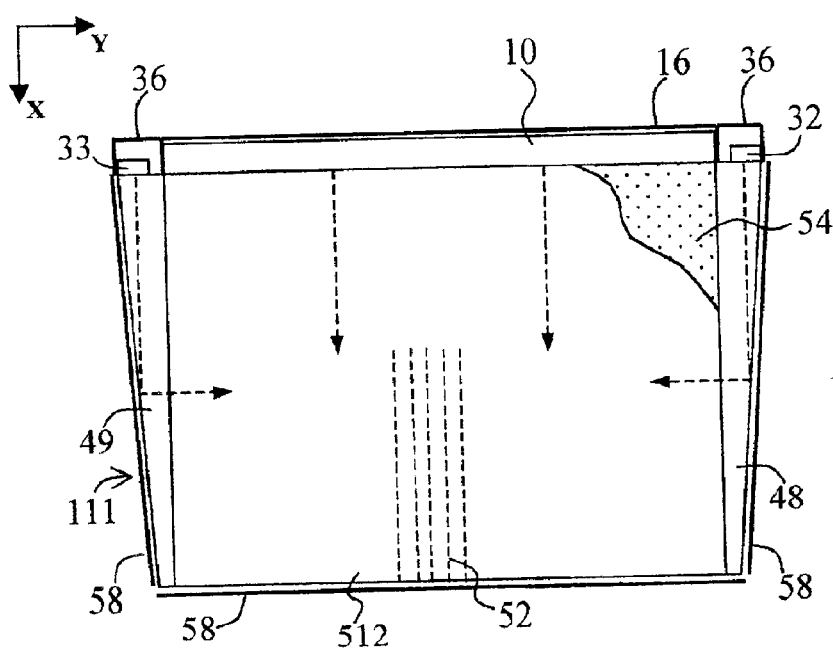
FIG.7B
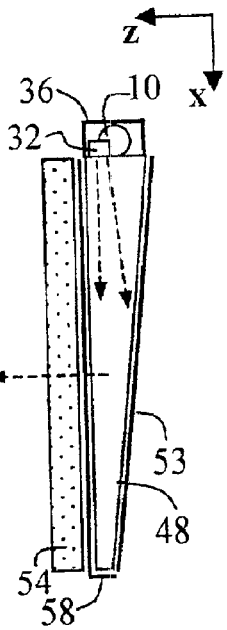
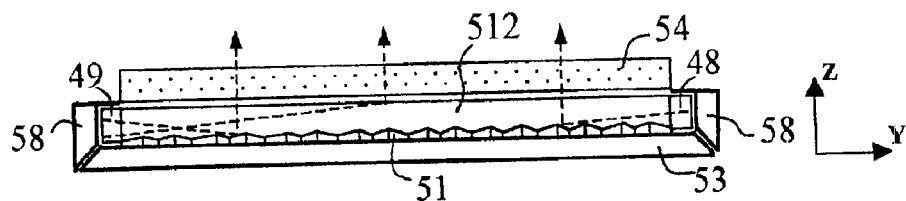
FIG.7C

LIQUID CRYSTAL DISPLAY DEVICE FOR USE IN ELECTRONIC APPARATUS

FIELD OF THE INVENTION

This invention relates to a liquid crystal display device and an electronic apparatus with a liquid crystal display device. More particularly, this invention relates to a structure and arrangement of a backlight device with improved power efficiency for use in a liquid crystal display device for electronic apparatuses.

BACKGROUND OF THE INVENTION

Maruyama et al., in their Japanese Patent Application Publication No. HEI 11-38410 A laid open for public inspection on Feb. 12, 1999, disclose use of a semi-transmissive liquid crystal display device in order to reduce liquid crystal display device power dissipation or consumption. The liquid crystal display device of Maruyama et al. is operated as a transmissive liquid crystal display device by the use of a cold-cathode fluorescent lamp (CCFL) as a backlight source, when the liquid crystal display device is operated in a dark environment. In a light environment, it does not use the cold cathode fluorescent lamp, but uses a white reflective plate to reflect environmental light so that the liquid crystal display device can be operated as a reflective liquid crystal display device.

In order to reduce power dissipation, Kurumizawa discloses in his Japanese Patent Application Publication No. HEI 11-101980 A laid open for public inspection on Apr. 13, 1999, a liquid crystal display device using a cold cathode fluorescent lamp and chemiluminescence. The liquid crystal display device of Kurumizawa uses a cold cathode fluorescent lamp as a backlight source when an electronic apparatus which employs the liquid crystal display device is operated from an AC power supply, while it uses a bag containing a chemiluminescent mixture solution as a backlight source when the electronic apparatus is operated from a DC battery.

The semi-transmissive liquid crystal display device disclosed in Japanese Patent Application Publication No. HEI 11-38410 A can use a DC power supply battery for a longer time when it is operated as a reflective liquid crystal display device in a light place. The semi-transmissive liquid crystal display device uses a cold cathode fluorescent lamp when it is used in a dark environment and, therefore, requires higher brightness. However, its display is less bright than and, therefore, inferior in quality to an ordinary transmissive liquid crystal display device when it is operated from the same power supply level as the ordinary transmissive liquid crystal display device, because light transmission is restricted due to its semi-transmissive nature. Accordingly, the liquid crystal display device of Maruyama et al. requires higher power to provide the same brightness as the ordinary transmissive liquid crystal display device.

The liquid crystal display device employing a cold cathode fluorescent lamp and chemiluminescence disclosed in Japanese Patent Application Publication No. HEI 11-101980 A requires a bag containing chemically luminescent mixture solution to be inserted into the liquid crystal display device. This liquid crystal display device is not economical because, once the bag starts emitting light, the light emission cannot be interrupted. In addition, a user of the liquid crystal display device must take a chemiluminescent bag or bags with him or her, and must take a trouble of disposing the used bag.

The inventors have recognized that power dissipation of a liquid crystal display device and an electronic apparatus with the liquid crystal display device can be reduced by selectively using a cold cathode fluorescent lamp and light-emitting diodes as a backlight source for the liquid crystal display device depending on brightness required for the liquid crystal display device.

An object of the present invention is to provide a liquid crystal display device with power efficient backlight sources selectively useable depending on desired brightness.

Another object of the present invention is to prolong the life of a battery used to operate an electronic apparatus through selective use of power efficient backlight sources for a liquid crystal display device used with the electronic apparatus depending on brightness required for the liquid crystal display device.

SUMMARY OF THE INVENTION

In accordance with one aspect of the present invention, an electronic apparatus includes a liquid crystal display device which includes a plurality of light sources including a cold cathode fluorescent lamp and a light-emitting diode (LED) and a liquid crystal unit. The electronic apparatus further includes a controller for selecting and operating at least one of the light sources in accordance with brightness required for the liquid crystal display device.

In an embodiment, the liquid crystal display device may further include at least one light guide plate which causes light from at least one of the plurality of light sources entering into the light guide plate through at least one surface thereof to be projected toward the liquid crystal unit.

The liquid crystal display device may further include a light guide member for causing light entering into it through one surface thereof to be scattered and projected through another surface thereof, and a light guide plate which causes the scattered light entering into it through one side surface thereof to be projected toward the liquid crystal unit.

The liquid crystal display device may further include at least one light guide plate for causing light entering into it through a side surface thereof from at least one of the light sources to be scattered and projected toward the liquid crystal unit.

In accordance with another aspect of the present invention, a liquid crystal display device includes a plurality of light sources including at least one cold cathode fluorescent lamp and at least one LED, a liquid crystal panel, a light guide plate for causing light from at least one of the plurality of light sources entering into the light guide plate through a surface thereof to be projected toward the liquid crystal panel, and a controller for selecting at least one of the plurality of light sources in accordance with required brightness and determining the brightness of the selected light source to operate the selected light source.

The present invention makes it possible to choose a backlight source having high power efficiency in accordance with required brightness in a liquid crystal display device, whereby the life of a battery for operating the backlight sources can be long. Also, an electronic apparatus with such a liquid crystal display device can be realized.

BRIEF DESCRIPTION OF THE DRAWINGS

FIGS. 1A, 1B, 1C and 1D illustrate a liquid crystal display device with a backlight device disposed on the rear surface of a transmissive liquid crystal panel, in accordance with an embodiment of the present invention;

FIGS. 2A and 2B illustrate a liquid crystal display device with a backlight device, in accordance with another embodiment of the invention;

FIGS. 3A and 3B illustrate a liquid crystal display device with a backlight device, in accordance with a further embodiment of the invention;

FIGS. 4A and 4B illustrate a liquid crystal display device with a backlight device, in accordance with a still further embodiment of the invention;

FIGS. 5A and 5B illustrate a liquid crystal display device with a backlight device, in accordance with a still further embodiment of the invention;

FIGS. 6A, 6B and 6C illustrate a liquid crystal display device with a backlight device, in accordance with a still further embodiment of the invention;

FIGS. 7A, 7B and 7C illustrate a liquid crystal display device with a backlight device, in accordance with a still further embodiment of the invention;

DESCRIPTION OF PREFERRED EMBODIMENTS

Figure 8A:
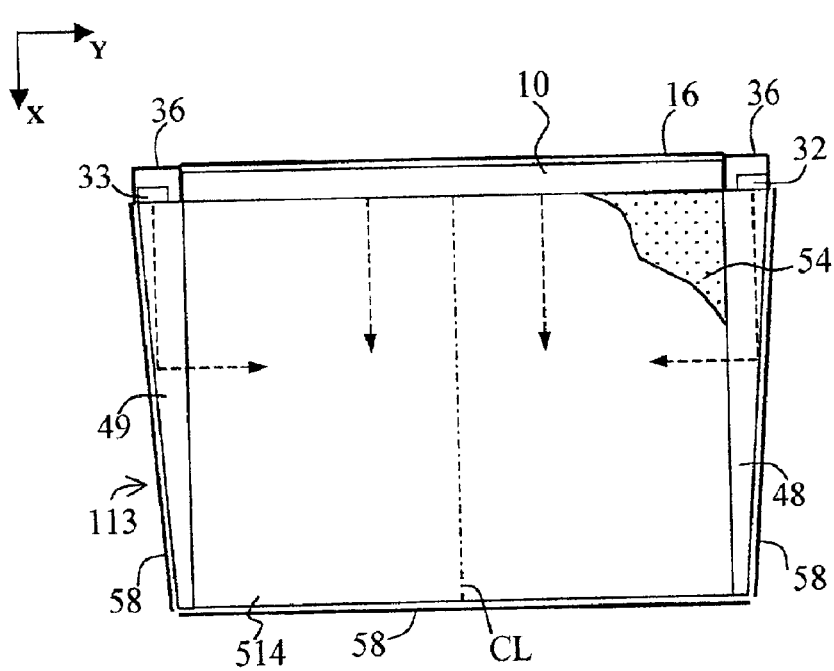
FIGS. 8A, 8B and 8C illustrate a liquid crystal display device with a backlight device, in accordance with a still further embodiment of the invention.

In accordance with the present invention a cold cathode tube or fluorescent lamp and a light emitting diode (LED) are used as light sources providing backlight for a transmissive liquid crystal display device (LCD) for use in a portable or mobile electronic apparatus, such as a notebook personal computer, a handheld personal computer or a personal digital assistant (PDA). For a range of low brightness, an LED has a higher power efficiency than a cold cathode fluorescent lamp. The inventors have recognized that, by the use of ten LED's for providing low display brightness obtainable by a cold cathode fluorescent lamp on a liquid crystal display screen having a display area of about 200 $cm^2$, dissipated power can be reduced by an amount of up to about 40% to about 60% (about 300 mW to about 400 mW) of the power which would be dissipated if the cold cathode fluorescent lamp was used.

In a transmissive liquid crystal display device in accordance with the present invention and an electronic apparatus with such a liquid crystal display device, a cold cathode fluorescent lamp is used for desired display brightness of, for example, 23 $cd/m^2$ higher than a threshold value of, for example, 20 $cd/m^2$ to thereby ensure satisfactory display quality. On the other hand, if a desired display brightness is equal to or lower than the threshold value, for example, 5 $cd/m^2$ or 20 $cd/m^2$, an LED is used to save the power dissipation to prolong the life of a battery. Also, the life of the cold cathode fluorescent lamp can be prolonged by using the LED as frequently as possible. For that purpose, switching control between the light sources is provided for the electronic apparatus.

Alternatively, when an external AC power supply is used for a transmissive liquid crystal display device and an electronic apparatus with such a liquid crystal display device, a cold cathode fluorescent lamp may be used as a light source to ensure satisfactory display quality. On the other hand, when a DC battery source is used, an LED may be used as a light source to save power dissipation so that the battery can be used longer.

Alternatively, when an external AC power supply is used or when desired display brightness is set to a value of, for example, 25 $cd/m^2$, which is higher than a threshold value of, for example, 20 $cd/m^2$, for a transmissive liquid crystal display device and an electronic apparatus with such a liquid crystal display device, a cold cathode fluorescent lamp may be used as a light source to thereby ensure satisfactory display quality. On the other hand, when a DC battery is employed as a power supply with desired brightness of, for example, 5 $cd/m^2$ or 20 $cd/m^2$, which is equal to or lower than the threshold value, an LED may be used.

Now, preferred embodiments are described with reference to the accompanying drawings. Throughout the drawings, similar or same elements and functions are provided with the same reference numerals.

FIGS. 1A, 1B and 1C illustrate a liquid crystal display device 5 including a transmissive liquid crystal panel 54 with a backlight device 100 disposed on the rear surface of the panel 54, in accordance with one embodiment of the present invention. FIG. 1A shows a front view of the liquid crystal display device 5 including the backlight device 100, and a light source switching control unit 72, a cold cathode fluorescent lamp driving unit 74 and an LED driving unit 76 which are associated with the liquid crystal display device 5. In FIG. 1A, the liquid crystal panel 54 is shown with its part removed. (Similarly, in FIGS. 2A, 3A, 4A, 5A, 6A, 7A, 8A, 9A, 10A, 11A and 12A, the liquid crystal panel 54 is shown with its part removed.) FIG. 1B is a left side view of the liquid crystal display device 5 shown in FIG. 1A, and FIG. 1C is a bottom view of the liquid crystal display device 5. FIG. 1D is useful for explaining the structure of a reflecting sheet or reflecting plate 53. As indicated in FIGS. 1A, 1B and 1C, the vertical direction is defined as an X direction, the horizontal direction is defined as a Y direction, and the direction perpendicular to both of the X and Y directions is defined as a Z direction.

The cold cathode fluorescent lamp driving unit 74 is coupled to an external AC power supply (not shown) and to a DC battery (not shown). The LED driving unit 76 is coupled to the DC battery. The LED driving unit 76 may be additionally coupled to the external AC power supply. The light source switching control unit 72 activates selectively the cold cathode fluorescent lamp driving unit 74 and the LED driving unit 76 in response to an instruction IS from a microprocessor or microcontroller 70 of an electronic apparatus (not shown). The microprocessor provides the instruction IS in accordance with display brightness set by a user.

Referring to FIGS. 1A, 1B and 1C, the backlight device 100 includes a cold cathode fluorescent lamp 10, a plurality of LED's 30, a light guide bar or rod 40, and a generally rectangular light guide plate 50. Typically, the light guides 40 and 50 are made of acrylic resin. The light guide plate 50 is disposed behind the transmissive liquid crystal panel 54 in parallel therewith. The light guide plate 50 has a flat and rectangular surface facing the liquid crystal panel 54, as shown in FIG. 1A, and has a downward tapered profile in the X-Z plane as shown in FIG. 1B. In other words, the rear surface of the light guide plate 50 tapers downward in the X direction and forward in the Z direction. The light guide plate 50 has the largest thickness of about 2 mm at the top and the smallest thickness of about 1 mm at the bottom.

The light guide bar 40 has a tapered or wedge-shaped profile which is the same as the profile of the light guide plate 50.

The rear surface of the light guide plate 50 is provided with a plurality of grooves 51 extending in the X direction so that a succession of a plurality of prismatic portions extending in the X direction and arranged in the Y direction can be formed, as shown in FIG. 1C. The prismatic portions formed by the grooves 51 in the light guide plate 50 scatter light entering in the Y direction from the LED's 30 through the light guide bar 40 within the light guide plate 50 to direct it forward in the Z direction. In FIG. 1A, parts of base lines and ridges of some of the prisms or the grooves 51, which extend in parallel with each other in the X direction, are shown by broken lines 52.

The rear surface of the light guide plate 50 is covered with a known reflecting sheet or plate 53. As shown in FIG. 1D, a number of protuberances having spherical surfaces or convex lens-shaped protuberances for scattering light are formed on the surface of the reflecting sheet 53 facing the light guide plate 50.

The cold cathode fluorescent lamp 10, which projects light toward the light guide plate 50 in the X direction, is disposed on the top surface of the light guide plate 50. Thus, the cold cathode fluorescent lamp 10 functions as a side light for the liquid crystal display device 5.

As described above, the LED's 30 are arranged on the left side surface of the light guide plate 50. The LED's 30 emit light through the elongated light guide bar 40 to the light guide plate 50. Thus, the LED's 30 also function as a side light of the liquid crystal display device 5. Similarly to the rear surface of the light guide plate 50, a plurality of grooves 41 extending in the Z direction are arranged in the X direction on the surface of the light guide bar 40 facing the LED's 30 so that prismatic portions can be formed. The grooves 41 or prismatic portions function to scatter light within the light guide bar 40. Base lines and ridges of some of the prismatic portions are indicated by broken lines 42 in FIG. 1B. Preferably, the LED's 30 are of the type emitting light which is white or approximately white.

The cold cathode fluorescent lamp 10 is enclosed in a cover formed by reflecting plates 16, which opens toward the top surface of the light guide plate 50. The LED's 30 and the light guide bar 40 are enclosed in a cover formed by reflecting plates 36, which opens toward the light guide plate 50. Typically, the reflecting plates 16 and 36 are made of aluminum and provided with a mirror surface film applied over their inner surfaces. Reflecting sheets 58 cover the bottom and right side surfaces of the light guide plate 50, as shown in FIG. 1A. Throughout the drawings, except FIG. 1D, the portions of the reflecting plates and sheets 16, 36 and 58 and other elements located on the viewer's side are not shown to facilitate understanding of the structure of the backlight device 100.

In operation, in the electronic apparatus including the liquid crystal display device 5 shown in FIGS. 1A, 1B and 1C with the backlight device 100, when the desired brightness set by the user is higher than a threshold value of, for example, 20 cd/m$^2$, the processor 70 supplies an instruction IS for selecting the cold cathode fluorescent lamp and designating the magnitude of the display brightness to the light source switching control unit 72. In response to the instruction IS from the microprocessor 70, the light source switching control unit 72 supplies a control signal CTRL to activate the cold cathode fluorescent lamp driving unit 74 which powers the cold cathode fluorescent lamp 10, and also causes the cold cathode fluorescent lamp driving unit 74 to control the brightness of the cold cathode fluorescent lamp 10 in accordance with the desired brightness.

When the desired display brightness set by the user is equal to or lower than the threshold value of 20 cd/m$^2$, the processor 70 supplies the instruction IS for selecting the LED's and designating the magnitude of the display brightness to the light source switching control unit 72. In response to this instruction IS, the light source switching control unit 72 provides a control signal CTRL to activate the LED driving unit 76 which powers the LED's 30, and also causes the LED driving unit 76 to control the brightness of the LED's 30 in accordance with the desired display brightness.

In an alternative arrangement, when the electronic apparatus is operated from an AC power supply, the processor 70 may supply the light source switching control unit 72 with an instruction IS for causing the cold cathode fluorescent lamp to be selected and for designating the magnitude of the display brightness. In response to this instruction IS, the light source switching control unit 72 provides a control signal CTRL to activate the cold cathode fluorescent lamp driving unit 74 which powers the cold cathode fluorescent lamp 10, and also causes the cold cathode fluorescent lamp driving unit 74 to control the brightness of the cold cathode fluorescent lamp 10 for providing a desired display brightness in a relatively high brightness range of, for example, 15 cd/m$^2$ and higher. On the other hand, when the electronic apparatus is operated from a DC battery, the processor 70 supplies the light source switching control unit 72 with an instruction IS for causing the LED's to be selected and for designating the magnitude of the display brightness. In response to this instruction IS, the light source switching control unit 72 provides a control signal CTRL to activate the LED driving unit 76 which powers the LED's 30, and also causes the LED driving unit 76 to control the brightness of the LED's 30 for providing a desired display brightness in a relatively low brightness range of, for example, from 5 cd/m$^2$ to 20 cd/m$^2$.

In a still alternative arrangement, when the electronic apparatus is powered from an AC power supply, or when the electronic apparatus is powered from a DC battery and the desired brightness designated by the user is higher than a threshold value of, for example, 20 cd/m$^2$, the processor 70 may supply the light source switching control unit 72 with an instruction IS for selecting the cold cathode fluorescent lamp and designating the magnitude of the display brightness. In response to this instruction IS, the light source switching control unit 72 supplies the cold cathode fluorescent lamp driving unit 74 with a control signal CTRL to activate the cold cathode fluorescent lamp driving unit 74, and also causes the cold cathode fluorescent lamp driving unit 74 to control the brightness of the cold cathode fluorescent lamp 10 in accordance with the desired brightness designated by the user. On the other hand, when the electronic apparatus is operated from a DC battery and the desired brightness designated by the user is equal to or lower than the threshold value of 20 cd/m$^2$, the processor 70 supplies the light source switching control unit 72 with an instruction IS for selecting the LED's and designating the magnitude of the display brightness. In response to this instruction IS, the light source switching control unit 72 supplies the LED driving unit 76 with a control signal CTRL to activate the LED driving unit 76, and also causes the LED driving unit 76 to control the brightness of the LED's 30 in accordance with the desired brightness designated by the user.

Light is projected downward into the light guide plate 50 from the cold cathode fluorescent lamp 10 as represented by broken line arrows in FIG. 1A, and scattered and reflected by the reflecting sheet 53 on the slanting rear surface of the light guide plate 50 and by the reflecting sheets 58 on the right side and bottom surfaces of the light guide plate 50 so that it can be directed to the liquid crystal panel 54 as indicated by broken line arrows in FIG. 1B. Light emitted by the LED's 30, represented by broken line arrows in FIG. 1A, is projected rightward toward the light guide plate 50 through the light guide bar 40. Because of the grooves 41 in the light guide bar 40, the light is scattered in the light guide bar 40, and the scattered light enters into the light guide plate 50. The scattered light entering the light guide plate 50 is, then, scattered and reflected again by the prismatic portions formed by the grooves 51 in the rear surface of the light guide plate 50 and is directed to the liquid crystal panel 54 as represented by broken line arrows in FIG. 1C.

As described, the use of the cold cathode fluorescent lamp 10 as the backlight source ensures good display quality, while the use of the LED's 30 as the backlight source can prolong the life of the DC battery used as the power source.

FIGS. 2A and 2B show a liquid crystal display device with a backlight device 101 in accordance with another embodiment of the present invention. FIG. 2A is a front view of the liquid crystal display device including the backlight device 101, and FIG. 2B is a right side view of the liquid crystal display device shown in FIG. 2A. Similarly to the embodiment shown in FIG. 1A, a cold cathode fluorescent lamp 10 of FIG. 2A is connected to a cold cathode fluorescent lamp driving unit 74 similar to the one shown in FIG. 1A, and LED's 30 of FIG. 2A are connected to an LED driving unit 76 similar to the one shown FIG. 1A, although the driving units 74 and 76 are not shown in FIG. 2A.

The liquid crystal display device shown in FIGS. 2A and 2B include a rectangular light guide plate 502 having a uniform thickness of about 2 mm. The cold cathode fluorescent lamp 10 is disposed on the upper surface of the light guide plate 502. A plurality of LED's 30, which emit light directly into the light guide plate 502, are disposed beneath the bottom surface of the light guide plate 502. A liquid crystal panel 54 is disposed in front of the light guide plate 502. The cold cathode fluorescent lamp 10 is enclosed in a cover formed by reflecting plates or sheets 16 which opens toward the light guide plate 502, and the LED's 30 are enclosed in a cover formed by reflecting plates or sheets 36, which opens toward the light guide plate 502. The left and right side surfaces of the light guide plate 502 are covered with reflecting sheets 58.

Light from the cold cathode fluorescent lamp 10 is projected downward into the light guide plate 502 as represented by broken line arrows, and scattered and reflected by the reflecting sheet 53 on the rear surface of the light guide plate 502 and also by the reflecting sheets 58 on the left and right side surfaces of the light guide plate 502. Light from the cold cathode fluorescent lamp 10 is then directed toward the liquid crystal panel 54 as shown in FIG. 2B.

Light from the LED's 30 is projected upward as represented by broken line arrows, scattered and reflected by the reflecting sheet 53 on the rear surface of the light guide plate 502, and directed to the liquid crystal panel 54, as shown in FIG. 2B. In this embodiment, the light guide bar 40 used in the embodiment shown in FIGS. 1A–1C is not required, but, since an LED, in general, has directivity regarding light emission, causing light to diverge forward, there may be dark portions in the bottom of the light guide plate 502 at locations where no LED's 30 are disposed. Accordingly, as the LED's for this embodiment, low directivity LED's, which may be provided by appropriately designing mold resin for them, are preferred.

FIGS. 3A and 3B illustrate a liquid crystal display device with a backlight device 103 in accordance with a further embodiment of the invention. FIG. 3A is a front view of the liquid crystal display device including the backlight device 103, and FIG. 3B is a right side view of the liquid crystal display device of FIG. 3A. Although not shown in FIG. 3A, a cold cathode fluorescent lamp 10 of FIGS. 3A and 3B is connected to a cold cathode fluorescent lamp driving unit 74 similar to the one shown in FIG. 1A, and LED's 32 and 34 is connected to an LED driving unit 76 similar to the one shown in FIG. 1A.

The backlight device 103 includes an elongated light guide bar 44 extending along the bottom surface of a light guide plate 503. The LED's 32 are arranged on the right end surface of the light guide bar 44, and the LED's 34 are arranged on the left end surface of the light guide bar 44. Similarly to the light guide bar 40 of FIG. 1A, the light guide bar 44 includes a plurality of grooves 41 extending in the Z direction which are arranged in the Y direction such that a succession of prismatic portions are formed in the bottom portion of the light guide bar 44. Also, as shown in FIG. 3B, the rear surface of the light guide plate 503 is provided with a plurality of grooves 51 which extend in the horizontal direction Y such that a succession of prismatic portions arranged in the X direction can be formed in the rear portion of the light guide plate 503. By virtue of the grooves 51, light propagating in the X direction in the light guide plate 503 is scattered and reflected so that it is projected forward in the Z direction to a liquid crystal panel 54. The front, rear and bottom surfaces of the light guide bar 44 are covered with reflecting sheets 58. The remainder of the structure of the backlight device 103 is similar to the backlight device 101 shown in FIGS. 2A and 2B, and is not described again.

As represented by broken line arrows in FIGS. 3A and 3B, light emitted by the LED's 32 and 34 enters into the light guide bar 44, where it is scattered by the prismatic portions formed by the grooves 41, and the scattered light is directed upward into the light guide plate 503. The scattered light entering into the light guide plate 503 is scattered by the prismatic portions formed by the grooves 51 and reflected by the reflecting sheet 53 to be projected toward the liquid crystal panel 54 as represented by broken line arrows in FIG. 3B. In this manner, the light guide bar 44 produces a uniform brightness over the entire light guide plate 503.

As represented by broken line arrows, the cold cathode fluorescent lamp 10 projects light into the light guide plate 503, as in the embodiment shown in FIGS. 2A and 2B. The light entering into the light guide plate 503 is scattered by the prismatic portions in the rear surface of the plate 503 and reflected by the reflecting sheet 53 to be projected toward the liquid crystal panel 54.

FIGS. 4A and 4B illustrate a liquid crystal display device with a backlight device 105 in accordance with a still further embodiment of the invention. FIG. 4A is a front view of the liquid crystal display device with the backlight device 105, and FIG. 4B is a right side view of the liquid crystal display device of FIG. 4A.

In FIGS. 4A–4B, 5A–5B, 6A–6C, 7A–7C, 8A–8C, 9A–9C, 10A–10B , 11A–11B and 12A–12C, although not shown, a cold cathode fluorescent lamp driving unit 74 similar to the one shown in FIG. 1A is connected to a cold cathode fluorescent lamp 10, and an LED driving unit 76 similar to the one shown in FIG. 1A is connected to LED's 32, 34 and the like.

The backlight device 105 includes a light guide plate 506 which is similar to the light guide plate 50 shown in FIGS. 1A through 1C and, therefore, tapered or wedged downward. The thickest, top portion has a thickness of about 2 mm, and the thinnest, bottom portion has a thickness of about 1 mm. The rear surface of the light guide plate 506 can be planar. The light guide bar 44 for scattering light is disposed between the upper surface of the tapered light guide plate 506 and the cold cathode fluorescent lamp 10, and the LED 32 is disposed at the right end of the light guide bar 44, and the LED 34 is disposed at the left end of the light guide bar 44. Similarly to the light guide bar 44 of FIG. 3A, a plurality of grooves 41 extending in the Z direction and arranged in the Y direction are formed in the upper surface of the light guide bar 44. Similarly to the embodiment shown in FIGS. 3A and 3B, the cold cathode fluorescent lamp 10 is enclosed in a cover formed of reflecting plates 16, and the LED's 32 and 34 are enclosed in covers formed of reflecting plates 36. The rear surface of the light guide plate 506 is covered with a reflecting sheet 53. Also, the right and left side surfaces and the bottom surface of the light guide plate 506 are covered with reflecting sheets 58. Further, although not shown, the front and rear surfaces of the light guide bar 44 are covered with the reflecting sheets 58. In this embodiment, since the light guide plate 506 is tapered or wedged, the size and weight of the liquid crystal display device can be reduced.

Light from the cold cathode fluorescent lamp 10, as represented by broken line arrows, passes through the light guide bar 44 into the light guide plate 506, and is scattered and reflected by the reflecting sheet 53 on the rear surface of the light guide plate 506 to be directed to the liquid crystal panel 54, as shown in FIG. 4B. Light from the LED's 32 and 34, as represented by broken line arrows, passes in the Y direction into the light guide bar 44 and is scattered by the prismatic portions formed in the light guide bar 44 by the grooves 41. The scattered light is directed downward into the light guide plate 506, further scattered and reflected by the reflecting sheet 53 on the rear surface of the light guide plate 506, and directed to the liquid crystal panel 54.

FIGS. 5A and 5B illustrate a liquid crystal display device with a backlight device 107 in accordance with a still further embodiment of the invention. FIG. 5A is a front view of the liquid crystal display device including the backlight device 107. FIG. 5B is a right side view of the liquid crystal display device of FIG. 5A. FIG. 5A shows the liquid crystal display device with parts of a cold cathode fluorescent lamp 10 and a reflecting sheet 16 removed in order to show a portion of a light guide bar 44 disposed behind the cold cathode fluorescent lamp 10.

The backlight device 107 includes a light guide plate 508 tapered or wedged, similarly to the light guide plate 506 shown in FIGS. 4A and 4B. The top portion of the light guide plate 508 has the largest thickness of about 3 mm, and the thinnest, bottom portion has a thickness of about 1.5 mm. On top of the light guide plate 508, light bar guide 44 is disposed and the light scattering, light guide bar 44 is also disposed behind the lamp 10. An LED 32 is disposed at the right end of the cold cathode fluorescent lamp 10, and an LED 34 is disposed at the left end of the light bar guide 44. In the upper surface of the light guide bar 44, a plurality of grooves 41 similar to the grooves 41 in the bar 44 shown in FIGS. 4A and 4B, extending in the Z direction are arranged in the Y direction. The cold cathode fluorescent lamp 10 is enclosed in a cover formed of reflecting plates 16 which is similar to the cover shown in FIGS. 4A and 4B, and the LED's 32 and 34 are enclosed in covers formed of reflecting plates 36 like the ones shown in FIGS. 4A and 4B. The left and right side and bottom surfaces of the light guide plate 508 are covered with reflecting sheets 58. The upper, front and rear surfaces of the light guide bar 44 are also covered with the reflecting sheets 58.

Light from the cold cathode fluorescent lamp 10 propagates downward and enters directly into the light guide plate 508, as indicated by broken line arrows, and is scattered and reflected by the reflecting sheet 53 disposed on the rear surface of the light guide plate 508 to be projected toward the liquid crystal panel 54, as represented by broken line arrows in FIG. 3B. As in the embodiment shown in FIGS. 4A and 4B, light from the LED's 32 and 34 is emitted in the horizontal Y direction and is scattered by the prismatic portions formed by the grooves 41 in the light guide bar 44. The scattered light is projected downward into the light guide plate 508 and is further scattered and reflected by the reflecting sheet 53 on the rear surface of the light guide plate 508 to be projected toward the liquid crystal panel 54.

Since light from the cold cathode fluorescent lamp 10 enters directly into the light guide plate 508, it is attenuated less than in the embodiment of FIGS. 4A and 4B. When the cold cathode fluorescent lamp 10 is energized, the upper portion of the liquid crystal panel 54 may be darker than the rest because of the thickness in the upper portion of the light guide plate 508. If such occurs, the LED's 32 and 34 as well as the cold cathode fluorescent lamp 10 can be energized to supplement the low brightness provided by the cold cathode fluorescent lamp 10 in the upper portion of the liquid crystal panel 54.

FIGS. 6A, 6B and 6C illustrate a liquid crystal display device with a backlight device 109 in accordance with a still further embodiment of the invention. FIG. 6A is a front view of the liquid crystal display device including the backlight device 109. FIGS. 6B and 6C are right side and bottom views, respectively, of the liquid crystal display device of FIG. 6A.

The backlight device 109 includes a tapered or wedge-shaped light guide plate 510 similar to the light guide plate 50 of the embodiment shown in FIGS. 1A, 1B and 1C, with a thickest, top portion having a thickness of about 2 mm and a thinnest, bottom portion having a thickness of about 1 mm. The light guide plate 510 is provided with a plurality of grooves 51 extending in the vertical X direction. A cold cathode fluorescent lamp 10 is disposed on top of the light guide plate 510, which emits light toward the light guide plate 510. On and along the right side surface of the light guide plate 510, there is disposed an elongated, wedge-shaped light guide bar 46. Also an elongated, wedge-shaped light guide bar 47 is disposed on and along the left side surface of the light guide plate 510. The front surfaces of the light guide bars 46 and 47 are in parallel with a liquid crystal panel 54, and the left and right side surfaces of the light guide bars 46 and 47 are in parallel with the right and left side surfaces of the light guide plate 510. The rear surfaces of the light guide bars 46 and 47 slant downward, as the light guide plate 510. A plurality of grooves 41 extending in the Z direction and arranged in the X direction are formed in each of the right and left side surfaces, i.e. outer surfaces, of the light guide bars 46 and 47, respectively, similarly to the light guide bar 44 shown in FIG. 3A. On the top and bottom end surfaces of the light guide bar 46, LED's 32 and 34 are disposed, respectively. Similarly, on the top and bottom end surfaces of the light guide bar 47, LED's 33 and 35 are disposed, respectively. The cold cathode fluorescent lamp 10 is covered with reflecting plates 16, leaving the lower side open, and the LED's 32, 33, 34 and 35 are covered with reflecting plates 36, leaving the sides facing the light guide bars 46 and 47 open. The rear and bottom surfaces of the light guide plate 510 are covered with a reflecting sheet 53 and a reflecting sheet 58, respectively. The front, right side and rear side surfaces of the light guide bar 46 are covered with the reflecting sheets 58, and the front, left side and rear surfaces of the light guide bar 47 are also covered with the reflecting sheets 58.

As represented by broken line arrows, light from the cold cathode fluorescent lamp 10 is projected downward into the light guide plate 510 and scattered and reflected by the reflecting sheet 53 disposed on the slanting rear surface of the light guide plate 510 to be projected toward a liquid crystal panel 54, as represented by broken line arrows in FIG. 6B. The LED's 32 and 33 emit light vertically downward into the light guide bars 46 and 47, respectively, and the LED's 34 and 35 emit light vertically upward into the light guide bars 46 and 47, respectively. The light from the LED's 32, 33, 34 and 35 is then scattered and reflected by the prismatic portions formed by the grooves 41 in the light guide bars 46 and 47 and directed horizontally into the light guide plate 510. The light entering into the light guide plate 510 is then scattered by the prismatic portions formed by the grooves 51 and directed toward the liquid crystal panel 54. In this embodiment, the LED's 32, 33, 34 and 35 are disposed, being spaced from each other. Accordingly, a more uniform distribution of brightness can be realized over the liquid crystal panel 54, whereby the brightness can be increased efficiently.

FIGS. 7A, 7B and 7C illustrate a liquid crystal display device with a backlight device 111 hi accordance with a still further embodiment of the invention. FIG. 7A is a font view of the liquid crystal display device including the backlight device 111. FIGS. 7B and 7C are right side and bottom views, respectively, of the liquid crystal display device of FIG. 7A.

The backlight device 111 includes a light guide plate 512 having a downward tapered or wedge-shaped profile like the light guide plate 50 of the embodiment shown in FIGS. 1A–1C , and elongated light guide bars 48 and 49 disposed on and along the right and left side surfaces of the light guide plate 512. Each of the light guide bars 48 and 49 has parallel top and bottom surfaces like the light guide bars of the embodiments of FIGS. 1A–1C and FIGS. 6A–6C . The top surface has a larger size of about 2 mm×about 2 mm than the bottom surface which has a size of about 1 mm×about 1 mm. The side surfaces of the light guide bars 48 and 49 adjacent to the light guide plate 512 are in parallel with the side surfaces of the plate 512, and the front surfaces of the light guide bars 48 and 49 are in line with the front surface of the light guide plate 512. Thus, the light guide bar 48 tapers downward with the rear surface slanting forward and with the right side surface slanting leftward. Similarly, the light guide bar 49 tapers downward with the rear surface slanting forward and with the left side surface slanting rightward.

An LED 32 is disposed on the top surface of the light guide bar 48, and an LED 33 is disposed on the top surface of the light guide bar 49. The remainder of the structure of the backlight device 111 is the same as the backlight device 109 shown in FIGS. 6A–6C, and is not described again.

Since the light guide bars 48 and 49 have their side surfaces tapered in addition to their rear surfaces, the size and weight of the liquid crystal display device can be reduced.

Light from the cold cathode fluorescent lamp 10, as represented by broken line arrows, is projected downward into the light guide plate 512 and scattered and reflected by a reflecting sheet 53 on the rear surface of the light guide plate 512 to be projected toward a liquid crystal panel 54, as represented by broken line arrows in FIG. 6B. The LED's 32 and 33 emit light downward into the light guide bars 48 and 49, respectively, as represented by broken line arrows, and the light is reflected by reflecting sheets 58 on their slanting side surfaces to enter horizontally into the light guide plate 512 where it is scattered by the prismatic portions formed by grooves 51 in the rear surface of the light guide plate 512 and directed toward the liquid crystal panel 54.

Figure 8B:
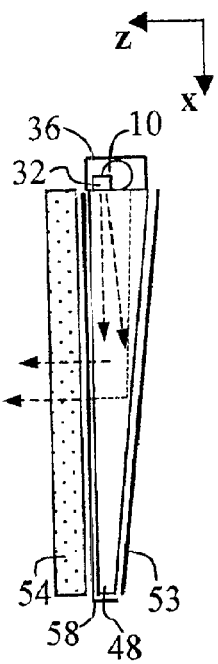
Figure 8C:
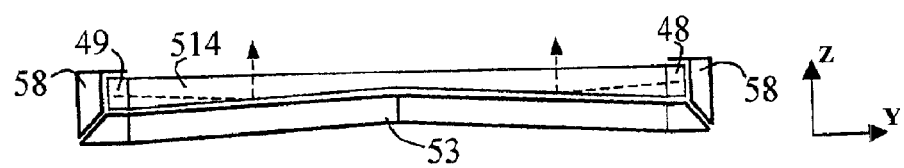

FIGS. 8A, 8B and 8C illustrate a liquid crystal display device with a backlight device 113 in accordance with a still further embodiment of the invention. FIG. 8A is a front view of the liquid crystal display device including the backlight device 113. FIGS. 8B and 8C are right side and bottom views, respectively, of the liquid crystal display device of FIG. 8A. A liquid crystal panel 54 disposed in front of the backlight device 113 is not shown in FIG. 8C.

The backlight device 113 includes a modified wedge-shaped light guide plate 514. The front surface of the light guide plate 514 is in parallel with the liquid crystal panel 54. The light guide plate 514 has symmetrical right and left halves with respect to a vertical center line CL. The light guide plate 514 tapers from the left and right sides toward the center line CL so that it is thinnest along the center line CL. The light guide plate 514 tapers also from the top toward the bottom. The rear surface of the light guide plate 514 is covered with a reflecting sheet 53. The remainder of the structure of the backlight device 113, including light guide bars 48 and 49 disposed along the side surfaces of the light guide plate 514, is the same as the backlight device 111 shown in FIGS. 7A, 7B and 7C, and is not described again.

By making the light guide plate 514 thinnest along the vertical center line CL, light emitted by the LED's 32 and 33 entering inward into the light guide plate 514 can be efficiently directed toward the liquid crystal panel 54.

As represented by broken line arrows, light from a cold cathode fluorescent lamp 10 enters downward into the light guide plate 514 and is scattered and reflected by the reflecting sheet 53 to propagate toward the liquid crystal panel 54 as indicated by broken line arrows in FIG. 8B. LED's 32 and 33 emit downward directed light into the light guide bars 48 and 49, respectively. The light is, then, reflected by a reflecting sheet 58 on each of the outer side surfaces and enters horizontally in the Y direction into the light guide plate 514 where it is scattered and reflected by the reflecting sheet 53 to propagate toward the liquid crystal panel 54, as shown in FIG. 8B.

Figure 9A:
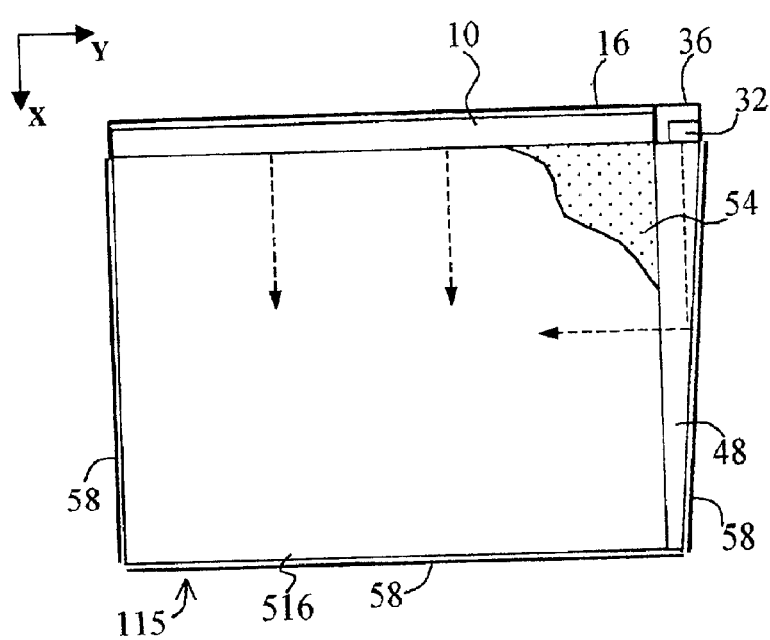
FIGS. 9A, 9B and 9C illustrate a liquid crystal display device with a backlight device, in accordance with a still further embodiment of the invention.
Figure 9B:
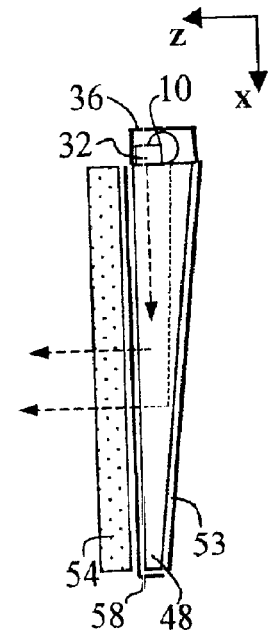
Figure 9C:
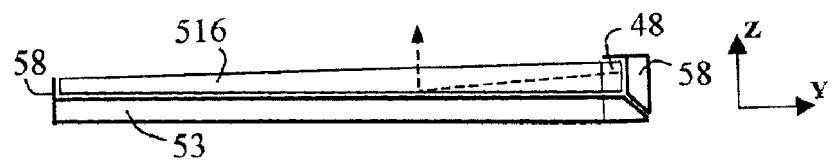

FIGS. 9A, 9B and 9C illustrate a liquid crystal display device with a backlight device 115 in accordance with a still further embodiment of the invention. FIG. 9A is a front view of the liquid crystal display device including the backlight device 115. FIGS. 9B and 9C are right side and bottom views, respectively, of the liquid crystal display device of FIG. 9A. In FIG. 9C, a liquid crystal panel 54 disposed in front of the backlight device 115 is not shown.

The structure and design of the backlight device 115 is the same as the right half of the backlight device 113 shown in FIGS. 8A–8C. The backlight device 115 requires only one LED 32 and only one light guide bar 48, but an LED that can provide higher brightness may have to be used as the LED 32.

Figure 10A:
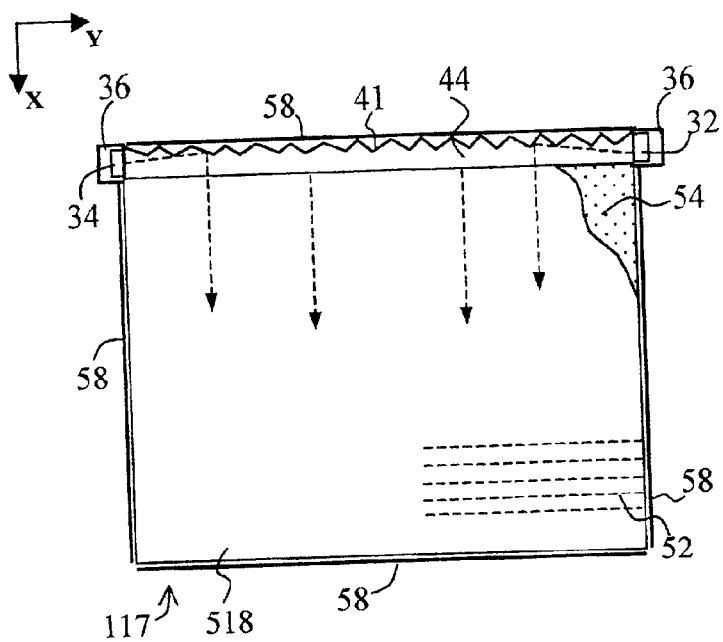
FIGS. 10A and 10B illustrate a liquid crystal display device with a backlight device, in accordance with a still further embodiment of the invention.
Figure 10B:
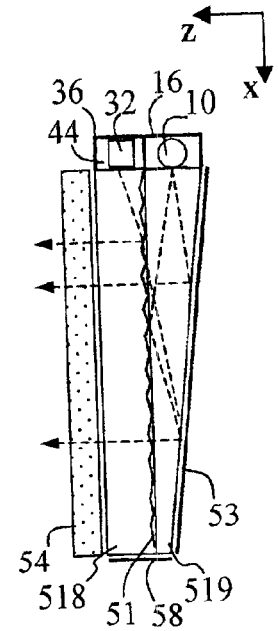

FIGS. 10A and 10B illustrate a liquid crystal display device with a backlight device 117 in accordance with a still further embodiment of the invention. FIG. 10A is a front view of the liquid crystal display device including the backlight device 117. FIG. 10B is a right side view of the liquid crystal display device of FIG. 10A.

The backlight device 117 includes a downward tapering light guide plate 519 which a typical liquid crystal display device employs, and an additional light guide plate 518 disposed between the light guide plate 519 and a liquid crystal panel 54. The light guide plate 518 has substantially parallel front and rear surfaces, parallel top and bottom surfaces and parallel side surfaces, and is provided with a plurality of grooves 51 extending in the Y direction in the rear surface. The grooves 51 are arranged in succession in the X direction, whereby a succession of prismatic portions are formed in the rear portion of the light guide plate 518. The prismatic portions scatters light entering into the light guide plate 518 in the X direction so that the light can propagate in the Z direction. An elongated light guide bar 44 for scattering light is disposed to extend on and along the top surface of the light guide plate 518. Similarly to the light guide bar 44 shown in FIGS. 4A and 4B, a plurality of grooves 41 extending in the Z direction are formed in the top surface of the light guide bar 44. The grooves 41 are arranged in succession along the Y direction. LED's 32 and 34 are disposed adjacent to the right and left ends of the light guide bar 44. A cold cathode fluorescent lamp 10 is disposed on top of the wedge-shaped light guide plate 519.

The upper, front and rear sides of the cold cathode fluorescent lamp 10 are covered with reflecting plates 16. The LED's 32 and 34 are covered with reflecting plates 36, except the inward facing sides. The left and right side surfaces and the bottom surfaces of the light guide plates 518 and 519 are covered with reflecting sheets 58. The rear surface of the light guide plate 519 is also covered with a reflecting sheet 53. The top, front and rear surfaces of the light guide bar 44 are covered with the reflecting sheets 58.

Light from the cold cathode fluorescent lamp 10 is directed from the top surface of the light guide plate 519 downward into it, where it is scattered and reflected by the reflecting sheet 53 on the rear surface of the light guide plate 519 and directed toward the liquid crystal panel 54, as represented by broken line arrows in FIGS. 10A and 10B.

The LED's 32 and 34 emit light, as represented by broken line arrows, in the horizontal Y direction into the light guide bar 44 through its right and left end surfaces. The light is, then, scattered by the prismatic portions in the top portion of the light guide bar 44 and directed downward into the light guide plate 518, where it is further scattered by the prismatic portions provided by the horizontally extending grooves 51 and is directed toward the liquid crystal panel 54, as shown in FIG. 10B. Part of light entering through the rear surface of the light guide plate 518 into the light guide plate 519 is reflected by the reflecting sheet 53 back into the light guide plate 518 and propagates toward the liquid crystal panel 54, as shown in FIG. 10B.

Figure 11A:
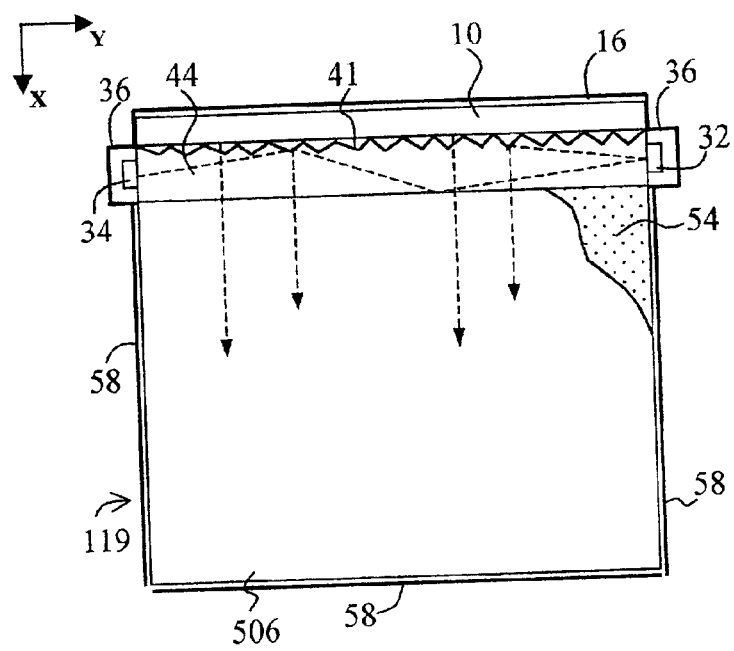
FIGS. 11A and 11B illustrate a liquid crystal display device with a backlight device, in accordance with a still further embodiment of the invention.
Figure 11B:
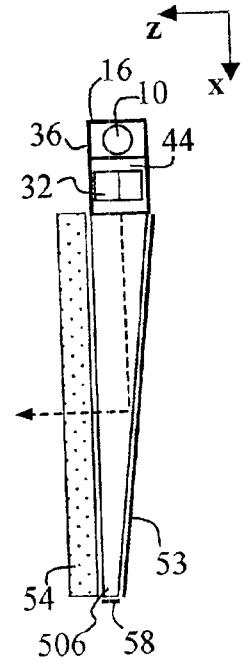

FIGS. 11A and 11B illustrate a liquid crystal display device with a backlight device 119 in accordance with a still further embodiment of the invention. FIG. 11A is a front view of the liquid crystal display device including the backlight device 119. FIG. 11B is a right side view of the liquid crystal display device of FIG. 11A. The backlight device 119 is the same as the backlight device 105 shown in FIGS. 4A and 4B, except that the backlight device 119 includes a plurality of LED's 12 disposed at the right end of the light guide bar 44 and a plurality of LED's 34 disposed at the left end of the light guide bar 44. The backlight device 119 can provide increased brightness by the use of plural LED's 32 and 34.

Figure 12A:
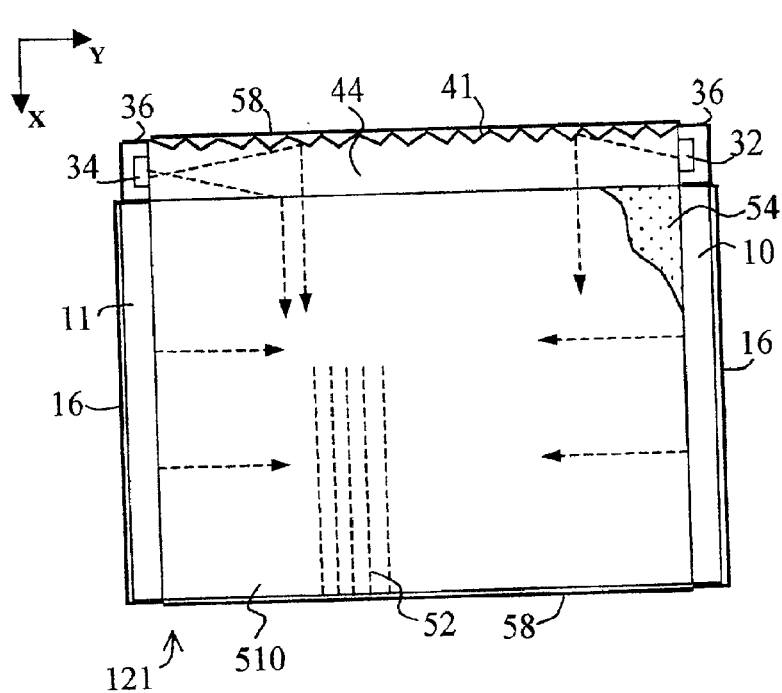
FIGS. 12A, 12B and 12C illustrate a liquid crystal display device with a backlight device, in accordance with a still further embodiment of the invention.
Figure 12B:
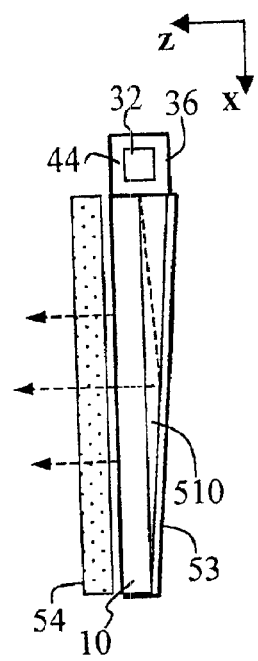
Figure 12C:
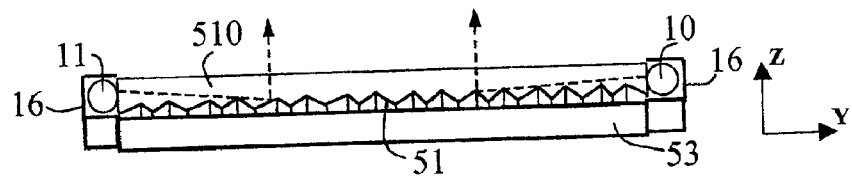

FIGS. 12A, 12B and 12C illustrate a liquid crystal display device with a backlight device 121 in accordance with a still further embodiment of the invention. FIG. 12A is a front view of the liquid crystal display device including the backlight device 121. FIGS. 12B and 12C are right side and bottom views, respectively, of the liquid crystal display device of FIG. 12A. The backlight device 121 is similar to the backlight device 109 shown in FIGS. 6A, 6B and 6C, except that a combination of LED's 32 and 34 and a light guide bar 44 is disposed on top of the light guide plate 510 in place of the cold cathode fluorescent lamp 10 and that two cold cathode fluorescent lamps 10 and 11 are disposed on the right and left side surfaces, respectively, of the light guide plate 510 in place of the combination of the LED's 32 and 34 with the light guide bar 44 and the combination of the LED's 33 and 35 with the light guide bar 47.

The LED's 32 and 34 are disposed on the right and left end surfaces, respectively, of the light guide bar 44 disposed on top of the light guide plate 510. The light guide bar 44 has a plurality of grooves extending in the Z direction arranged in the Y direction.

Although the two cold cathode fluorescent lamps 10 and 11 are used in this embodiment, only one cold cathode fluorescent lamp may be used.

Each of the cold cathode fluorescent lamps 10 and 11 is surrounded by reflecting plates 16, except the side facing the light guide plate 510. Each of the LED's 32 and 34 is also surrounded by reflecting plates 36, except the side facing the light guide bar 44. Also, the light guide bar 44 is surrounded by reflecting sheets 58, except the side facing the light guide plate 510.

The wedge-shaped light guide plate 510 has the same shape and configuration as the light guide plate 510 shown in FIGS. 6A, 6B and 6C, and is not described again.

Light from the cold cathode fluorescent lamps 10 and 11 enters in the horizontal Y direction into the light guide plate 510, as represented by broken line arrows in FIG. 12A, where it is scattered by the prismatic portions formed in the rear portion of the light guide plate 510 by the grooves 51, so that it can propagate toward a liquid crystal panel 54, as shown in FIG. 12C.

Light from the LED's 32 and 34 enters into the light guide bar 44 in the horizontal Y direction, as represented by broken line arrows in FIG. 12A, where it is scattered by the prismatic portions formed by the grooves 41 and directed downward into the light guide plate 510. The light from the light guide bar 44, then, is scattered and reflected by the reflecting sheet 53 on the rear surface of the light guide plate 510 so as to be directed toward the liquid crystal panel 54, as represented by broken line arrows in FIG. 12B.

The above-described embodiments are only typical examples, and a person skilled in the art may readily modify the illustrated embodiments to realize the objects of the present invention based on the principle of the present invention without departing the scope of the invention as defined by the accompanying claims, by, for example, appropriately combining the elements of the embodiments.

What is claimed is:

1. An electronic apparatus comprising:
   a liquid crystal display device including a plurality of light sources including a cold cathode fluorescent lamp and a light emitting diode, and including a liquid crystal unit; and
   a controller for selecting and operating at least one of said plurality of light sources in accordance with desired brightness of said liquid crystal display device, said controller selecting said cold cathode fluorescent lamp when said desired brightness is above a predetermined threshold, and said controller selecting said light emitting diode, when said desired brightness is equal to or lower than said predetermined threshold, and when a battery is available as a power supply and an AC power supply is not available.

2. The electronic apparatus according to claim 1 wherein said controller determines brightness of said selected light source in accordance with said desired brightness.

3. The electronic apparatus according to claim 1 wherein said controller selects said cold cathode fluorescent lamp when an AC power supply is available.

4. The electronic apparatus according to claim 1 wherein said liquid crystal display device further includes at least one light guide plate for directing light entering thereinto from at least one of said plurality of light sources through an end surface thereof toward said liquid crystal unit.

5. The electronic apparatus according to claim 4 wherein said light guide plate has a generally rectangular shape and has a substantially uniform thickness.

6. The electronic apparatus according to claim 4 wherein said light guide plate has a generally rectangular shape and has a thickness tapering from one side toward an opposite side.

7. The electronic apparatus according to claim 4 wherein said light guide plate has a generally rectangular shape and has a thickness tapering from opposing two sides thereof toward a center line.

8. The electronic apparatus according to claim 4 wherein said light guide plate has a generally rectangular shape and has its thickness tapering from one of a pair of opposing sides to the other and from one of the other pair of opposing sides to the other.

9. The electronic apparatus according to claim 4 wherein a plurality of parallel grooves are formed in a rear surface of said light guide plate so that light entering into said light guide plate can be scattered by a rear portion of said light guide plate.

10. The electronic apparatus according to claim 1 wherein said liquid crystal display device further includes at least one light guide plate for scattering and directing light entering from at least one of said plurality of light sources into said light guide plate through an end surface thereof toward said liquid crystal unit.

11. The electronic apparatus according to claim 1 wherein said liquid crystal display device further includes a light guide member for scattering light entering thereinto through at least one surface thereof and causing the scattered light to go out through another surface thereof, and a light guide plate for directing said scattered light entering thereinto through an end surface thereof toward said liquid crystal unit.

12. The electronic apparatus according to claim 11 wherein said light guide member has two opposing ends, and a plurality of parallel grooves are formed in a surface extending between said opposing ends of said light guide member.

13. The electronic apparatus according to claim 1 wherein said liquid crystal display device further includes a light guide plate for directing light entering thereinto from at least one of said plurality of light sources through an end surface thereof toward said liquid crystal unit, and an elongated light guide member tapering from one end toward an opposite end for directing light entering thereinto through said one end toward said light guide plate.

14. The electronic apparatus according to claim 1 wherein said liquid crystal display device further includes a light guide member for causing light entering thereinto from said light emitting diode through one surface thereof to go out from said light guide member through another surface thereof, and a light guide plate for directing said light entering thereinto from said light guide member through an end surface thereof toward said liquid crystal unit and for directing light entering thereinto from said cold cathode fluorescent lamp through an end surface thereof toward said liquid crystal unit.

15. The electronic apparatus according to claim 1 wherein said liquid crystal display device further includes a first light guide plate for directing light entering thereinto through an end surface thereof from said cold cathode fluorescent lamp toward said liquid crystal unit, and a second light guide plate for directing light entering thereinto through an end surface thereof from said light emitting diode toward said liquid crystal unit.

16. The electronic apparatus according to claim 1 wherein said liquid crystal display device further includes a light guide member for causing light entering thereinto from said light emitting diode through one surface thereof to go out from said light guide member through another surface thereof, a first light guide plate for directing said light of said light emitting diode entering thereinto through an end surface thereof from said light guide member toward said liquid crystal unit, and a second light guide plate for directing light entering thereinto through an end surface thereof from said cold cathode fluorescent lamp toward said liquid crystal unit.

17. A liquid crystal display device comprising:

a plurality of light sources including at least one cold cathode fluorescent lamp and at least one light emitting diode;

a liquid crystal panel;

a light guide plate for causing light entering thereinto through an end surface thereof from at least one of said plurality of light sources to go out through another surface thereof toward said liquid crystal panel; and a controller for selecting at least one of said plurality of light sources in accordance with desired brightness, determining brightness of the selected light source in accordance with said desired brightness, and operating said selected light source, said controller selecting said cold cathode fluorescent lamp when said desired brightness is above a predetermined threshold, and said controller selecting said light emitting diode, when said desired brightness is equal to or lower than said predetermined threshold, and when a battery is available as a power supply and an AC power supply is not available.

* * * * *